(12) United States Patent
Wang et al.

(10) Patent No.: US 9,168,515 B2
(45) Date of Patent: Oct. 27, 2015

(54) HIGH-SELECTIVITY CATALYST FOR PRODUCTION OF HIGH-QUALITY GASOLINE FRACTIONS FROM SYNGAS AND ITS PREPARATION METHOD

(75) Inventors: Ye Wang, Yantai (CN); Jincan Kang, Yantai (CN); Lei Zhang, Yantai (CN); Qinghong Zhang, Yantai (CN); Kang Cheng, Yantai (CN); Qingge Zhai, Yantai (CN); Jiansheng Ding, Yantai (CN); Weiqi Hua, Yantai (CN); Yinchuan Lou, Yantai (CN)

(73) Assignee: Wanhua Industrial Group Co., Ltd., Yantai, Shandong Province (CN)

( * ) Notice: Subject to any disclaimer, the term of this patent is extended or adjusted under 35 U.S.C. 154(b) by 0 days.

(21) Appl. No.: 13/321,056

(22) PCT Filed: Apr. 2, 2011

(86) PCT No.: PCT/CN2011/072422
§ 371 (c)(1),
(2), (4) Date: Nov. 17, 2011

(87) PCT Pub. No.: WO2012/135993
PCT Pub. Date: Oct. 11, 2012

(65) Prior Publication Data
US 2014/0018232 A1    Jan. 16, 2014

(51) Int. Cl.
| | |
|---|---|
| *B01J 29/06* | (2006.01) |
| *B01J 29/80* | (2006.01) |
| *B01J 29/18* | (2006.01) |
| *B01J 29/16* | (2006.01) |
| *B01J 29/26* | (2006.01) |
| *B01J 29/40* | (2006.01) |
| *B01J 29/70* | (2006.01) |
| *B01J 29/78* | (2006.01) |
| *B01J 29/072* | (2006.01) |
| *C10L 1/04* | (2006.01) |
| *C10G 2/00* | (2006.01) |
| *B01J 29/14* | (2006.01) |
| *B01J 29/24* | (2006.01) |
| *B01J 29/46* | (2006.01) |
| *B01J 29/48* | (2006.01) |
| *B01J 29/76* | (2006.01) |
| *B01J 37/18* | (2006.01) |
| *B01J 29/08* | (2006.01) |
| *B01J 29/22* | (2006.01) |
| *B01J 29/44* | (2006.01) |
| *B01J 35/02* | (2006.01) |
| *B01J 37/00* | (2006.01) |
| *C01B 39/40* | (2006.01) |
| *C01B 39/48* | (2006.01) |

(52) U.S. Cl.
CPC .............. *B01J 29/80* (2013.01); *B01J 29/072* (2013.01); *B01J 29/088* (2013.01); *B01J 29/146* (2013.01); *B01J 29/166* (2013.01); *B01J 29/185* (2013.01); *B01J 29/22* (2013.01); *B01J 29/24* (2013.01); *B01J 29/26* (2013.01); *B01J 29/405* (2013.01); *B01J 29/44* (2013.01); *B01J 29/46* (2013.01); *B01J 29/48* (2013.01); *B01J 29/7007* (2013.01); *B01J 29/7038* (2013.01); *B01J 29/7057* (2013.01); *B01J 29/7088* (2013.01); *B01J 29/7615* (2013.01); *B01J 29/7676* (2013.01); *B01J 29/7815* (2013.01); *B01J 29/7876* (2013.01); *B01J 35/023* (2013.01); *B01J 37/0036* (2013.01); *B01J 37/18* (2013.01); *C01B 39/40* (2013.01); *C01B 39/48* (2013.01); *C10G 2/332* (2013.01); *C10G 2/334* (2013.01); *C10L 1/04* (2013.01); *B01J 2229/38* (2013.01); *C10G 2300/70* (2013.01); *C10G 2400/02* (2013.01)

(58) Field of Classification Search
USPC ..................... 502/60, 73, 74, 77, 78, 85, 86
See application file for complete search history.

(56) References Cited

U.S. PATENT DOCUMENTS

| | | | | |
|---|---|---|---|---|
| 2009/0005464 | A1* | 1/2009 | Hoffer et al. ................... | 518/715 |
| 2009/0036296 | A1* | 2/2009 | Hu et al. ......................... | 502/78 |
| 2009/0143220 | A1* | 6/2009 | Dias, Jr. et al. ................. | 502/66 |

FOREIGN PATENT DOCUMENTS

| | | |
|---|---|---|
| CN | 1418933 A | 5/2003 |
| CN | 101224430 A | 7/2008 |

(Continued)

OTHER PUBLICATIONS

Martinez, et al.; "A detailed study of the activity and deactivation of zeolites in hybrid Co/SiO2-zeolite Fischer-Tropsch catalysts"; Journal of Catalysis, 249, 2007, pp. 162-173.

(Continued)

*Primary Examiner* — Elizabeth Wood
(74) *Attorney, Agent, or Firm* — Ohlandt, Greeley, Ruggiero and Perle, L.L.P.

(57) ABSTRACT

The invention relates to a catalyst for selective synthesis of high-quality gasoline fractions from syngas and the preparation method of the catalyst. This catalyst consists of cobalt, a promoter and molecular sieve, wherein cobalt is presented in an amount of 1-30%, the promoter is represented in an amount of 0.01-5% and the balance is molecular sieve based on the weight of the catalyst. This catalyst provides superior selectivity for $C_5$-$C_{11}$ isoparaffins and relatively lower selectivity for wax-type hydrocarbons with more than 20 carbon atoms. Thereof, this catalyst can be used for the synthesis of high-quality gasoline and is good at preventing catalyst coking. Besides, the invention provides a preparation method of the catalyst.

10 Claims, No Drawings

(56) References Cited

FOREIGN PATENT DOCUMENTS

| | | | |
|---|---|---|---|
| CN | 101269328 A | 9/2008 | |
| CN | 101811050 A | 8/2010 | |
| CN | 101890361 A | 11/2010 | |

OTHER PUBLICATIONS

Li, et al.; "Gasoline-range hydrocarbon synthesis over cobalt-based Fischer-Tropsch catalysts supported on SiO2/HZSM-5"; Energy & Fuels, 2008, 22, pp. 1897-1901.

Bao, et al; "A core/shell catalyst produces a spatially confined effect and shape selectivity in a consecutive reaction"; Angew. Chem. Int. Ed., 2008, 47, pp. 353-356.

Li, et al.; "One-step synthesis of H-B zeolite-enwrapped Co/Al2O3 Fischer-Tropsch catalyst with high spatial selectivity"; Journal of Catalysis, 265, 2009, pp. 26-34.

Martinez, et al.; "The influence of ZSM-5 zeolite composition and crystal size on the in situ conversnio of Fischer-Tropsch products over hybrid catalysts"; Applied Catalysis A: General, 294, 2005, pp. 251-259.

Botes, et al.; "The addition of HZSM-5 to the Fischer-Tropsch process for improved gasoline production"; Applied Catalysis A: General, 267, 2004, pp. 217-225.

\* cited by examiner

HIGH-SELECTIVITY CATALYST FOR PRODUCTION OF HIGH-QUALITY GASOLINE FRACTIONS FROM SYNGAS AND ITS PREPARATION METHOD

FIELD OF THE INVENTION

The invention relates to a catalyst for Fischer-Tropsch synthesis and its preparation method. Particularly, the invention relates to a catalyst for Fischer-Tropsch synthesis, which can produce high-yield production of gasoline fractions that contain high content of isoparaffin, and the preparation method thereof.

BACKGROUND OF THE INVENTION

Fischer-Tropsch synthesis is a process that converts syngas into hydrocarbons via catalytic reactions, which includes reactions of generation of alkanes and alkenes, together with reactions of generation of oxygen-containing compounds and water-gas shift. The reactants of Fischer-Tropsch synthesis, i.e. syngas, can be derived from coal, natural gas, coal-bed methane, biomass etc. via process of gasification or reformation. The products of Fischer-Tropsch synthesis include clean liquid fuels such as gasoline, diesel oil and kerosene, basic chemical raw materials such as short-chained alkenes, and high added-value chemicals such as high-grade wax. In recent years, as petroleum is continuously consumed and the demands for energy and resources keep increasing in the world, Fischer-Tropsch synthesis has been extensively recognized as a proven method for producing liquid fuels and high added-value chemicals. Companies such as Sasol and Shell have already established industrialized production facilities for coal to oil (CTL) and natural gas to oil (GTL). Besides, companies such as Exxon Mobil, Syntroleum, BP and so on, and gas/coal rich countries are also planning commercialization of Fischer-Tropsch synthesis. In China, there are companies such as Shenhua, SYNFUELs CHINA, Yankuang Group and etc. that have built industrial demonstration facilities for indirect production of oils from coal based on Fischer-Tropsch synthesis.

Researches focusing on Fischer-Tropsch synthesis has lasted for nearly 90 years, but there are still some problems unsolved, among which a critical one is the ineffective control of product selectivity. As the products' chain-growth follows polymerization mechanism and the product selectivity usually follows Anderson-Schulz-Flory distribution, only can relatively high selectivity be achieved for methane and heavy hydrocarbons ($C_{21}^+$), the selectivities for the other products are low, among which gasoline fractions ($C_5$-$C_{11}$) has a selectivity of up to about 45% and diesel ($C_{12}$-$C_{20}$) has a selectivity of up to about 30%. The product of commercialized Fischer-Tropsch synthesis is usually a mixture of a few oil-components. Therefore, more attention has been attracted to the development of new catalysts that can effectively control the product selectivity.

CN 101811050A disclosed a cobalt-based catalyst modified by lipophilic organic group for Fischer-Tropsch synthesis. The catalyst contains 5.0-30.0% of cobalt, 50-80% of support, 5-20% of silica and 5-40% of lipophilic group. The catalyst can be simply synthesized and enables Fischer-Tropsch synthesis with higher conversion for CO (60%), selectivity of 50% for intermediate fraction $C_5$-$C_{11}$ and less than 2% for $C_{19}^+$.

CN 1418933A disclosed a catalyst for selective syntheses of gasoline and diesel fractions from syngas. The catalyst comprises active metal Fe, and promoters such as Cu, K, Co, Ru or the like, and activated carbon is used as a support. This catalyst enables higher selectivity for $C_1$-$C_{20}$ hydrocarbons, among which the selectivity for $C_5$-$C_{20}$ hydrocarbons can reach 76.6%.

CN 101269328A disclosed a cobalt-based catalyst for syntheses of gasoline and diesel fractions from syngas. The catalyst mainly consists of Co and $TiO_2$ and enables conversion of CO to be 60% and selectivity for $C_5$-$C_{11}$ to be 40% in fixed bed reactors.

CN 101224430A disclosed a cobalt-based catalyst modified by lipophilic organic groups for Fischer-Tropsch synthesis, which mainly consists of cobalt, noble metal promoters and porous silica gel. This catalyst enables conversion of CO up to 70% and selectivity for $C_5$-$C_{11}$ to be about 50%.

Martinez et al. (A. Martinez et al. *J. Catal.* 2007, 249, 162) discovered that higher selectivity for gasoline fractions can be achieved by using a composite catalyst which is prepared by physically mixing the conventional cobalt-based catalyst for Fischer-Tropsch synthesis and zeolite molecular sieve (H-ZSM-5 etc.). For example, composite catalyst $Co/SiO_2$+ZSM-5 enables up to 62% of selectivity for $C_5$-$C_{12}$ when conversion of syngas is 60%. It is reported (Y. Li et al. *Energy Fuel* 2008, 22, 1897) that better catalytic performances can be achieved by a catalyst prepared by mixing $SiO_2$ and ZSM-5 to form composite oxide and then loading Co thereon, by which the conversion of CO is more than 80%, the selectivity for $C_5$-$C_{12}$ reaches 55% and the content of isoparaffins is more than 10%. Tsubaki et al. (N. Tsubaki et al. *Angew. Chem. Int. Ed.* 2008, 47, 353; *J. Catal.* 2009, 265, 26) prepared a novel core-shell structured catalyst for Fischer-Tropsch synthesis by wrapping conventional $Co/Al_2O_3$ catalyst with In-Situ-Formed H-beta molecular sieve membrane. The catalyst enables Fischer-Tropsch synthesis with selectivity of 55% for $C_5$-$C_{12}$, which mainly contains isoparaffins. However, one disadvantage of the catalyst is the selectivity for methane usually exceeds 15%.

What's more, the applicant of this application lately disclosed a catalyst that enables high selectivity for the synthesis of gasoline fractions from syngas in CN 101890361A. The catalyst consists of Ru and molecular sieve and enables significantly high selectivity for $C_5$-$C_{11}$ hydrocarbon fractions. On the basis of this invention, the applicant made further development of a new catalyst for Fischer-Tropsch synthesis to prepare high-quality gasoline fractions by one-step from syngas with high selectivity as claimed in this invention.

SUMMARY OF THE INVENTION

This invention aims to provide an improved catalyst for Fischer-Tropsch synthesis and the preparation method of this catalyst. This catalyst provides high selectivity for the synthesis of $C_5$-$C_{11}$ hydrocarbons and avoids or significantly reduces catalyst coking, both of which contribute to production of high-quality gasoline from syngas with low cost.

The catalyst with high selectivity for Fischer-Tropsch synthesis of high-quality gasoline fractions from syngas provided in this invention consists of cobalt, a promoter and molecular sieve. The catalyst contains 1-30% of cobalt, 0.01-5% of the promoter and balanced molecular sieve based on the total weight of the catalyst.

According to the catalyst for Fischer-Tropsch synthesis of this invention, the preferable contents of metal cobalt and promoter are 8-15% and 0.05-2%, respectively.

According to the catalyst for Fischer-Tropsch synthesis of this invention, the promoter is one or more selected from metal elements of IA, IIA, transition metals and rare earth elements, preferably one or more selected from Na, K, Mg, Mn, Ru, Zr, Ce and La, and more preferably one or more of Mn, Na and Ru.

According to the catalyst for Fischer-Tropsch synthesis of this invention, the molecular sieve is one or more of Beta, ZSM-5, MOR, Y and MCM-22, which have acidity and special porous structure. The Si/Al ratio of the molecular sieve is 5-300. Preferably, the molecular sieve is Beta and/or ZSM-5 having a Si/Al ratio of 20-100.

The acidity of the molecular sieve is denoted by the amount of $NH_3$ adsorbed. The adsorbing capability of the molecular sieve is 0.16-0.50 mmol $NH_3$/g. The molecular sieve has micropore-mesopore structure, wherein the micropore has a diameter of 0.4-0.9 nm, and the mesopore has a diameter of 2-30 nm, the specific surface area of the molecular sieve is 100-900 $m^2\ g^{-1}$, the pore volumes of the micropores and mesopores are 0.1-0.6 $cm^3 g^{-1}$ respectively.

In this invention, the molecular sieve is one or more of Beta, ZSM-5, MOR, Y and MCM-22, and is treated with basic solution. The particular treatment includes steps of:

(1) preparing a basic solution, preferably an aqueous solution containing an alkali or alkaline-earth metal ion, with a concentration from 0.005 mol $L^{-1}$ to saturation, in which the aqueous solution contains alkali or alkaline-earth metal ion is a solution formed by dissolving one or more of nitrate, nitrite, carbonate, bicarbonate, chloride, oxalate, acetate, citrate, hydroxide and oxide of the alkali or alkaline-earth metal in water;

(2) on the basis of a ratio between bulk volume of the molecular sieve and volume of the basic solution to be 0.2-20, preferably 0.5-5, taking and mixing the molecular sieve with the basic solution, and stirring for 0.1-5 hours at a temperature ranging from room temperature to 150° C.;

(3) filtering the obtained mixture and rinsing with de-ionized water until the concentration of the alkali or alkaline earth metal ion is not higher than 1 wt % in the filtrate, sufficiently drying the filtered cake until physically adsorbed water content is within 5 wt %, preferably within 1 wt %;

(4) adding the pretreated molecular sieve into 0.05-3.0 mol $L^{-1}$ of an ammonium solution, in which the ammonium is one or more of $NH_4NO_3$, $NH_4Cl$, $(NH_4)_2CO_3$, $NH_4HCO_3$ and $CH_3COONH_4$, stirring the mixture for 0.1-3 hours at 30-100° C., filtering and rinsing the mixture with de-ionized water until the concentration of ammonium and anions is not higher than 100 ppm in the filtrate, then drying the filtered cake at 80-120° C. for 5-20 hours and calcining at 400-600° C. for 3-10 hours in the air to get the treated molecular sieve.

In this invention, the Beta and ZSM-5 molecular sieve can be synthesized by hydrothermal synthesis also, including the steps of:

(1) adding a certain amount of aluminum-based compound into a 5-20 wt % of template solution and stirring for 0.5-2 hours to form a mixture, in which the aluminum-based compound is one or more of $Al(NO_3)_3$, $NaAlO_2$, $AlCl_3$, $Al(OOCCH_3)_3$ and $Al(O-CH-(CH_3)_2)_3$, the template is alkyl ammonium hydroxide or alkyl ammonium bromide, preferably tetra-ethyl ammonium hydroxide or tetra-propyl ammonium bromide, and a mole ratio between the template and the aluminum-based compound is 3-15;

(2) on the basis of a required Si/Al ratio, adding a stoichiometric silicon source into the mixture and stirring for 0.5-2 hours, in which the silicon source is one or more of fumed silica, silica gel, water glass and tetra-ethyl orthosilicate;

for Beta molecular sieve, charging the mixture into a reactor of hydrothermal synthesis and reacting at 100-170° C. for 24-96 hours, after cooling down, adding the obtained suspension into 50-100 ml of aqueous solution of 1-15 wt % of hexadecyl trimethyl ammonium bromide. Adjusting the acidity of the mixture to pH 7.5-10.5 with 30-70 wt % of acetic acid, charging the mixture back into the reactor of hydrothermal synthesis and further reacting at 90-130° C. for 24-96 hours;

for ZSM-5 molecular sieve, after addition of the silicon source, adding 30-50 ml of methanol solution of N,N-dimethyl-N-(3-(trimethylsilyl)propyl)hexadecane-1-aminium chloride with a concentration of 40-70% into the mixture, stirring for 0.5-2 hours and charging into the reactor reacting at 120-170° C. for 24-72 hours;

(3) after cooling down, collecting the reaction mixture from the reactor for filtration and rinsing with de-ionized water, and drying the filtered cake at 80-120° C. for 5-20 hours;

(4) grinding the obtained solid sufficiently and calcining at 400-600° C. in the air to get the molecular sieve.

This invention provides a preparation method of the catalyst with high selectivity for Fischer-Tropsch synthesis of high-quality gasoline fractions from syngas, which comprises the following steps:

(1) weighing a cobalt salt according to formula of the components of the catalyst of this invention, admixing with a solvent of de-ionized water, an alcohol or a ketone to prepare a 0.5-20 wt % of cobalt salt solution;

(2) weighing a promoter according to formula of the components of the catalyst of this invention, and adding into the prepared cobalt salt solution and stirring for 0.5-3 hours;

(3) weighing a molecular sieve according to formula of the components of the catalyst of this invention, adding the molecular sieve into the prepared cobalt salt solution, stirring for 0.1-15 hours and standing still for 0.1-0.24 hours;

(4) evaporating the solid-liquid mixture at 40-100° C. and drying the resulted solid at 30-100° C. in vacuum for 1-24 hours;

(5) calcining the dried solid at 300-550° C. for 2-10 hours in the air;

(6) shaping the calcined powder as a precursor of the catalyst;

(7) subjecting the precursor of the catalyst to reduction at 300-550° C. for 1-10 hours in an atmosphere of hydrogen or hydrogen-inert gas.

According to the preparation method of the catalyst with high selectivity for Fischer-Tropsch synthesis of high-quality gasoline fractions from syngas of this invention, the reduction of the precursor of the catalyst can be performed either during the process of catalyst preparation or before the catalytic Fischer-Tropsch synthesis.

According to the preparation method of the catalyst with high selectivity for Fischer-Tropsch synthesis of high-quality gasoline fractions from syngas of this invention, preferably, the cobalt salt is any one or more selected from $CoCl_2$, $Co(NO_3)_2$, $CoBr_2$, Cobalt(II) acetylacetonate and $Co(OOCCH_3)_2$.

According to the preparation method of the catalyst with high selectivity for Fischer-Tropsch synthesis of high-quality gasoline fractions from syngas of this invention, preferably, de-ionized water is used for preparing the cobalt salt solution and the concentration of the cobalt salt solution is 0.5-20 wt %, preferably 3-15 wt %.

According to the preparation method of the catalyst with high selectivity for Fischer-Tropsch synthesis of high-quality gasoline fractions from syngas of this invention, the promoter comprises an element that is selected from one or more of metal elements of IA and IIA, transition metals and rare earth elements, preferably one or more of Na, K, Mg, Mn, Ru, Zr, Ce and La, further preferably, one or more of Mn, Na and Ru;

the promoter is in a form of salt that is one or more of chloride, nitrate, bromide and acetate of the above promoter element.

As described in this invention, the catalyst with high selectivity for Fischer-Tropsch synthesis of high-quality gasoline fractions from syngas can be used for reactions in fixed bed reactors, as well as in slurry bed reactors or fluidized bed reactors. Usually, the Fischer-Tropsch synthesis using the catalyst was performed under the conditions that the reaction temperature is 180-300° C., the reaction pressure is 0.1-5 MPa, the space velocity of syngas is 500-6000 $h^{-1}$ and the volume ratio between $H_2$ and CO in syngas 1-3.

Comparing with the prior art, the catalyst and its preparation method for Fischer-Tropsch synthesis of this invention mainly have the benefits in the aspects below.

(1) The catalyst for Fischer-Tropsch synthesis described in this invention provides superior selectivity regarding hydrocarbons having 5-11 carbon atoms and mainly consisting of isoparaffins, that is high quality of gasoline can be obtained. In addition, the catalyst provides very low selectivity for wax-type hydrocarbons having more than 20 carbon atoms so that the devices for further catalytic cracking of wax can be omitted, and the problems such as catalyst coking, pipelines blockading and the like can also be greatly reduced, and thereby effectively lower the cost of the investment on equipment and the operating cost.

(2) The catalyst described in this invention uses the molecular sieve with special pore-structure that can be easily prepared, and is of low cost, but achieves significantly increased selectivity for $C_5$-$C_{11}$ hydrocarbons and restrains the generation of light hydrocarbons at the same time.

(3) The catalyst for Fischer-Tropsch synthesis described in this invention is suitable for various sources of syngas, such as low $H_2$/CO ratio syngas from coal or high $H_2$/CO ratio syngas from natural gas or coal-bed methane. Therefore, flexible sources of syngas can be served when using the catalyst of the invention without affecting the yield of the high-quality gasoline fractions.

(4) The catalyst support described in this invention is bifunctional. On one hand, its acidity facilitates the cracking and isomerization of heavy hydrocarbons to form gasoline fractions, on the other hand its suitable mesoporous structure benefits the diffusion of intermediate fractions and the cracking and isomerization of heavy hydrocarbons. The synergistic effect of the both functions significantly improves the selectivity for gasoline fractions.

Conclusively, the catalyst described in this invention has bifunctional and low cost, and it enables production of high-quality gasoline fractions. What's more, the catalyst may effectively reduce the investment on equipment and operating cost of Fischer-Tropsch synthesis and allows flexible selection of syngas sources for the production.

DETAILED DESCRIPTION

The Fischer-Tropsch catalyst and the preparation method thereof of the present invention will be illustrated in details below which are not intended to construct any limitation to the present invention.

Example 1

0.085 g of $NaNO_3$ was added into 100 ml of water to prepare 0.01 mol $L^{-1}$ of $NaNO_3$ solution. 8.0 g of MOR molecular sieve with the Si/Al ratio of 12 (Produced by Nankai University Catalyst Company, NKF-12) was added into the above solution. The resulted solution was stirred at 30° C. for 20 minutes, then subjected to filtration. The filtered cake was rinsed with de-ionized water and then dried at 100° C. for 5 hours. 5.0 g of the pretreated molecular sieve was added into 1.0 mol $L^{-1}$ of $NH_4NO_3$ solution, and the solution was stirred at 50° C. for 1 hour, and then filtered. The filtered cake was rinsed with de-ionized water and dried at 100° C. for 15 hours, and then calcined at 500° C. for 5 hours in the air to collect the molecular sieve support, which was marked as MOR-0.01M.

A cobalt nitrate solution was prepared by dissolving 0.8856 g of $Co(NO_3)_2.6H_2O$ in 25 ml of de-ionized water and then 0.0165 g of $RuCl_3.3H_2O$ was added therein. After stirring until completely dissolved, 2.0 g of MOR-0.01M molecular sieve was added into the solution, and the solution was stirred for 10 hours at room temperature followed by standing still for 15 hours, then evaporated by hot water bath at 60° C. After being dried at 40° C. for 15 hours under vacuum and sufficiently ground, the obtained powder was heated up to 400° C. with a speed of 1° C. $min^{-1}$ in the air and calcined at this temperature for 8 hours. The calcined powder was shaped into tablets, which were then crushed to obtain 30-60 mesh particles as the precursor of catalyst. 0.8 g of the precursor of catalyst was weighed out and subjected to reduction in a hydrogen atmosphere at 400° C. for 10 hours to get 8 wt % Co-0.1 wt % Ru/MOR-0.01M catalyst.

The Fischer-Tropsch synthesis was performed in a stainless steel fixed-bed micro-autoclave. The reacting conditions were as follows: the reaction temperature at 250° C., the reaction pressure at 2 MPa, the space velocity of syngas at 1.5 $L \cdot g^{-1} \cdot h^{-1}$, the ratio by volume between $H_2$ and CO in syngas being 2:1 and the amount of the catalyst being 0.8 g. The products were analyzed by on-line GC (Testing method provided by Shanghai Solution Analytic Technology Co.). The reaction performances of 8 wt % Co-0.1 wt % Ru/MOR-0.01M catalyst were listed in Table 1.

TABLE 1

| Catalyst Performances of 8 wt % Co-0.1 wt % Ru/MOR-0.01M | |
|---|---|
| CO Conversion (%) | 90.5 |
| $CH_4$ Selectivity (%) | 12.0 |
| Gaseous $C_2$-$C_4$ Hydrocarbon Selectivity (%) | 12.1 |
| Gasoline Fraction ($C_5$-$C_{11}$) Selectivity (%) | 71.7 |
| Diesel Fraction ($C_{12}$-$C_{20}$) Selectivity (%) | 4.2 |
| Wax $C_{21}^+$ Selectivity (%) | Not detected |

Example 2

0.085 g of $NaNO_3$ was added into 100 ml of water to prepare 0.01 mol $L^{-1}$ of $NaNO_3$ solution. 8.0 g of Beta molecular sieve with the Si/Al ratio of 25 (Produced by Nankai University Catalyst Company, NKF-6) was added into the above prepared solution. The solution was stirred at 30° C. for 30 minutes, then subjected to filtration. The filtered cake was rinsed with de-ionized water and dried at 100° C. for 5 hours. 5.0 g of the pretreated molecular sieve was added into 1.0 mol $L^{-1}$ of $NH_4NO_3$ solution, and the solution was stirred at 50° C. for 1 hour, then subjected to filtration. The filtered cake was rinsed with de-ionized water, dried at 100° C. for 15 hours and then calcined at 500° C. for 5 hours in the air to collect the molecular sieve support, which was marked as Beta-0.01M.

A cobalt nitrate solution was prepared by dissolving 0.8856 g of $Co(NO_3)_2.6H_2O$ in 20 ml de-ionized water and then 0.0781 g of $KNO_3$ was added therein. After stirring until complete dissolution, 2.0 g of Beta-0.01M molecular sieve was added into the above solution. The solution was stirred for 4 hours at room temperature followed by standing still for 10 hours, then evaporated by a hot water bath at 60° C. After being dried at 50° C. for 10 hours under vacuum and sufficiently ground, the obtained powder was heated with a temperature elevation speed of 5° C. min$^{-1}$ in the air until reaching 450° C. and calcined at this temperature for 8 hours. The calcined powder was shaped into tablets, which were then crushed to obtain 30-60 mesh particles as the precursor of catalyst. 1.0 g of the precursor was weighed out and reduced in a hydrogen atmosphere at 450° C. for 3 hours to get 8 wt % of Co-1 wt % K/Beta-0.01M catalyst.

The Fischer-Tropsch synthesis was performed in a stainless steel fixed-bed micro-autoclave, in which the conditions and the product analysis were the same as those described in Example 1. The performances were listed in Table 2.

TABLE 2

Catalyst Performances of 8 wt % Co-1 wt % K/Beta-0.01M

| | |
|---|---|
| CO Conversion (%) | 86.0 |
| $CH_4$ Selectivity (%) | 12.5 |
| Gaseous $C_2$-$C_4$ Hydrocarbon Selectivity (%) | 11.1 |
| Gasoline Fraction ($C_5$-$C_{11}$) Selectivity (%) | 67.4 |
| Diesel Fraction ($C_{12}$-$C_{20}$) Selectivity (%) | 8.8 |
| Wax $C_{21}^+$ Selectivity (%) | 0.2 |

Example 3

0.085 g of $NaNO_3$ was added into 100 ml of water to prepare 0.01 mol L$^{-1}$ of $NaNO_3$ solution. 8.0 g of ZSM-5 molecular sieve with the Si/Al ratio of 38 (Produced by Nankai University Catalyst Company, NKF-5) was added into the above prepared solution. The solution was stirred at 30° C. for 30 minutes, then subjected to filtration. The filtered cake was rinsed with de-ionized water and dried at 100° C. for 5 hours. 5.0 g of the pretreated molecular sieve was added into 1.0 mol L$^{-1}$ of $NH_4NO_3$ solution, and the solution was stirred at 50° C. for 2 hours, then subjected to filtration. The filtered cake was rinsed with de-ionized water, dried at 100° C. for 15 hours and then calcined at 500° C. for 5 hours in the air to collect the molecular sieve support, which was marked as ZSM-5-0.01M.

A cobalt nitrate solution was prepared by dissolving 1.6605 g of $Co(NO_3)_2.6H_2O$ in 30 ml de-ionized water and then 0.0674 g of $NaNO_3$ was added therein. After stirring until complete dissolution, 2.0 g of ZSM-5-0.01M molecular sieve was added into the above solution. The solution was stirred for 4 hours at room temperature followed by standing still for 10 hours, then evaporated by a hot water bath at 60° C. After being dried at 50° C. for 10 hours under vacuum and sufficiently ground, the obtained powder was heated with a temperature elevation speed of 5° C. min$^{-1}$ in the air until reaching 450° C. and calcined at this temperature for 8 hours. The calcined powder was shaped into tablets, which were then crushed to obtain 30-60 mesh particles as the precursor of catalyst. 0.8 g of the precursor was weighed out and reduced in a hydrogen atmosphere at 450° C. for 3 hours to get 15 wt % of Co-1 wt % Na/ZSM-5-0.01M catalyst.

The Fischer-Tropsch synthesis reaction was performed in a stainless steel fixed-bed micro-autoclave, in which the conditions and the product analysis were the same as those described in Example 1. The performances were listed in Table 3.

TABLE 3

Catalyst Performances of 15 wt % Co-1 wt % Na/ZSM-5-0.01M

| | |
|---|---|
| CO Conversion (%) | 91.4 |
| $CH_4$ Selectivity (%) | 15.0 |
| Gaseous $C_2$-$C_4$ Hydrocarbon Selectivity (%) | 13.2 |
| Gasoline Fraction ($C_5$-$C_{11}$) Selectivity (%) | 69.1 |
| Diesel Fraction ($C_{12}$-$C_{20}$) Selectivity (%) | 2.7 |
| Wax $C_{21}^+$ Selectivity (%) | Not detected |

Example 4

0.5128 g of $Mg(NO_3)_2.6H_2O$ was added into 100 ml of water to prepare 0.02 mol of $Mg(NO_3)_2$ solution. 8.0 g of Y molecular sieve with the Si/Al ratio of 5 (Produced by Nankai University Catalyst Company, NKF-8) was added into the above prepared solution. The solution was stirred at 30° C. for 30 minutes, then subjected to filtration. The filtered cake was rinsed with de-ionized water and dried at 100° C. for 5 hours. 5.0 g of the pretreated molecular sieve was added into 2.0 mol of $NH_4NO_3$ solution, and the solution was stirred at 50° C. for 2 hour, then subjected to filtration. The filtered cake was rinsed with de-ionized water, dried at 100° C. for 15 hours and then calcined at 500° C. for 5 hours in the air to collect the molecular sieve support, which was marked as Y-0.02M.

A cobalt nitrate solution was prepared by dissolving 0.4428 g of $Co(NO_3)_2.6H_2O$ in 30 ml de-ionized water and then 0.0104 g of $Ce(NO_3)_3.6H_2O$ was added therein. After stirring until complete dissolution, 4.0 g of Y-0.02M molecular sieve was added into the above solution, and the solution was stirred for 4 hours at room temperature followed by standing still for 10 hours, then evaporated by a hot water bath at 60° C. After being dried at 50° C. for 10 hours under vacuum and sufficiently ground, the obtained powder was heated with a temperature elevation speed of 5° C. min$^{-1}$ in the air until reaching 450° C. and calcined at this temperature for 8 hours. The calcined powder was shaped into tablets, which were then crushed to obtain 30-60 mesh particles as the precursor of catalyst. 0.8 g of the precursor was weighed out and reduced in a hydrogen atmosphere at 450° C. for 3 hours to get 2 wt % of Co-0.1 wt % Ce/Y-0.02M catalyst.

The Fischer-Tropsch synthesis was performed in a stainless steel fixed-bed micro-autoclave, in which the conditions and the product analysis were the same as those described in Example 1. The performances were listed in Table 4.

TABLE 4

Catalyst Performances of 2 wt % Co-0.1 wt % Ce/Y-0.02M

| | |
|---|---|
| CO Conversion (%) | 36.1 |
| $CH_4$ Selectivity (%) | 16.5 |
| Gaseous $C_2$-$C_4$ Hydrocarbon Selectivity (%) | 13.2 |
| Gasoline Fraction ($C_5$-$C_{11}$) Selectivity (%) | 60.6 |
| Diesel Fraction ($C_{12}$-$C_{20}$) Selectivity (%) | 9.1 |
| Wax $C_{21}^+$ Selectivity (%) | 0.6 |

Example 5

0.425 g of $NaNO_3$ was added into 100 ml of water to prepare 0.05 mol L$^{-1}$ of $NaNO_3$ solution. 8.0 g of MCM-22 molecular sieve with the Si/Al ratio of 30 (Produced by Nankai University Catalyst Company, NKF-10) was added into the above prepared solution. The solution was stirred at 30° C. for 30 minutes, then subjected to filtration. The filtered cake was rinsed with de-ionized water and dried at 100° C. for 5 hours. 5.0 g of the pretreated molecular sieve was added into 2.0 mol L$^{-1}$ of NH$_4$NO$_3$ solution, and the solution was stirred at 50° C. for 2 hours, then subjected to filtration. The filtered cake was rinsed with de-ionized water, dried at 100° C. for 15 hours and then calcined at 500° C. for 5 hours in the air to collect the molecular sieve support, which was marked as MCM-22-0.05M.

A cobalt nitrate solution was prepared by dissolving 6.1992 g of Co(NO$_3$)$_2$.6H$_2$O in 50 ml de-ionized water and then 0.7583 g of Zr(NO$_3$)$_4$.5H$_2$O was added therein. After stirring until complete dissolution, 4.0 g of MCM-22-0.05M molecular sieve was added into the above solution. The solution was stirred for 4 hours at room temperature followed by standing still for 10 hours, then evaporated by a hot water bath at 60° C. After being dried at 50° C. for 10 hours under vacuum and sufficiently ground, the obtained powder was heated with a temperature elevation speed of 5° C. min$^{-1}$ in the air until reaching 450° C. and calcined at this temperature for 8 hours. The calcined powder was shaped into tablets, which were then crushed to obtain 30-60 mesh particles as the precursor of catalyst. 0.8 g of the precursor was weighed out and reduced in a hydrogen atmosphere at 450° C. for 3 hours to get 28 wt % of Co-5 wt % Zr/MCM-22-0.05M catalyst.

The Fischer-Tropsch synthesis was performed in a stainless steel fixed-bed micro-autoclave, in which the conditions and the product analysis were the same as those described in Example 1. The performances were listed in Table 5.

TABLE 5

Catalyst Performances of 28 wt % Co-5 wt % Zr/MCM-22-0.05M

| | |
|---|---|
| CO Conversion (%) | 95.3 |
| CH$_4$ Selectivity (%) | 11.5 |
| Gaseous C$_2$-C$_4$ Hydrocarbon Selectivity (%) | 13.8 |
| Gasoline Fraction (C$_5$-C$_{11}$) Selectivity (%) | 61.7 |
| Diesel Fraction (C$_{12}$-C$_{20}$) Selectivity (%) | 10.5 |
| Wax C$_{21}^+$ Selectivity (%) | 2.5 |

Example 6

A cobalt nitrate solution was prepared by dissolving 1.7712 g of Co(NO$_3$)$_2$.6H$_2$O in 30 ml de-ionized water and then 0.1562 g of KNO$_3$ was added therein. After stirring until complete dissolution, 2.0 g of Beta-0.01M molecular sieve and 0.2 g of ZSM-5-0.01M molecular sieve were added into the above solution, and the solution was stirred for 4 hours at room temperature followed by standing still for 10 hours, then evaporated by a hot water bath at 60° C. After being dried at 50° C. for 10 hours under vacuum and sufficiently ground, the obtained powder was heated with a temperature elevation speed of 5° C. min$^{-1}$ in the air until reaching 450° C. and calcined at this temperature for 8 hours. The calcined powder was shaped into tablets, which were then crushed to obtain 30-60 mesh particles as the precursor of catalyst. 0.8 g of the precursor was weighed out and reduced in a hydrogen atmosphere at 450° C. for 3 hours to get 8 wt % of Co-1 wt % K/(Beta-0.01M+ZSM-5-0.01M) catalyst.

The Fischer-Tropsch synthesis was performed in a stainless steel fixed-bed micro-autoclave, in which the conditions and the product analysis were the same as those described in Example 1. The performances were listed in Table 6.

TABLE 6

Catalyst Performances of 8 wt % Co-1 wt % K/(Beta-0.01M + ZSM-5-0.01M)

| | |
|---|---|
| CO Conversion (%) | 85.3 |
| CH$_4$ Selectivity (%) | 14.3 |
| Gaseous C$_2$-C$_4$ Hydrocarbon Selectivity (%) | 14.0 |
| Gasoline Fraction (C$_5$-C$_{11}$) Selectivity (%) | 66.8 |
| Diesel Fraction (C$_{12}$-C$_{20}$) Selectivity (%) | 4.9 |
| Wax C$_{21}^+$ Selectivity (%) | Not detected |

Example 7

A cobalt nitrate solution was prepared by dissolving 0.8856 g of Co(NO$_3$)$_2$.6H$_2$O in 30 ml de-ionized water and then 0.1042 g of Mn(CH$_3$COO)$_2$.4H$_2$O was added therein. After stirring until complete dissolution, 2.0 g of Beta-0.01M molecular sieve was added into the above solution, and the solution was stirred for 8 hours at room temperature followed by standing still for 15 hours, then evaporated by a hot water bath at 80° C. After being dried at 50° C. for 15 hours under vacuum and sufficiently ground, the obtained powder was heated with a temperature elevation speed of 5° C. min$^{-1}$ in the air until reaching 450° C. and calcined at this temperature for 10 hours. The calcined powder was shaped into tablets, which were then crushed to obtain 30-60 mesh particles as the precursor of catalyst. 0.8 g of the precursor was weighed out and reduced in a hydrogen atmosphere at 400° C. for 5 hours to get 8 wt % of Co-1 wt % Mn/Beta-0.01M catalyst.

The Fischer-Tropsch synthesis was performed in a stainless steel fixed-bed micro-autoclave, in which the conditions and the product analysis were the same as those described in Example 1. The performances were listed in Table 7.

TABLE 7

Catalyst Performances of 8 wt % Co-1 wt % Mn/Beta-0.01M

| | |
|---|---|
| CO Conversion (%) | 93.0 |
| CH$_4$ Selectivity (%) | 12.3 |
| Gaseous C$_2$-C$_4$ Hydrocarbon Selectivity (%) | 12.5 |
| Gasoline Fraction (C$_5$-C$_{11}$) Selectivity (%) | 70.1 |
| Diesel Fraction (C$_{12}$-C$_{20}$) Selectivity (%) | 5.1 |
| Wax C$_{21}^+$ Selectivity (%) | Not detected |

Example 8

0.85 g of NaNO$_3$ was added into 100 ml of water to prepare 0.1 mol L$^{-1}$ of NaNO$_3$ solution. 4.0 g of Beta molecular sieve with the Si/Al ratio of 25 (Produced by Nankai University Catalyst Company, NKF-6) was added into the above prepared solution. The solution was stirred at 65° C. for 50 minutes, then subjected to filtration. The filtered cake was rinsed with de-ionized water until the concentration of Na$^+$ in the filtrate was not more than 90 ppm, then dried at 100° C. for 5 hours. 3.0 g of the pretreated molecular sieve was added into 1.0 mol L$^{-1}$ of NH$_4$NO$_3$ solution and the solution was stirred at 70° C. for 2 hours, then subjected to filtration. The filtered cake was rinsed with de-ionized water, dried at 100° C. for 15 hours and then calcined at 500° C. for 5 hours in the air to collect the molecular sieve support, which was marked as Beta-0.1M.

A cobalt nitrate solution was prepared by dissolving 0.8856 g of Co(NO$_3$)$_2$.6H$_2$O in 30 ml de-ionized water and then 0.0062 g of NaNO$_3$ was added therein. After stirring until complete dissolution, 2.0 g of Beta-0.1M molecular sieve was added into the above solution, and the solution was stirred for 10 hours at room temperature followed by standing still for 12 hours, then evaporated by a hot water bath at 70° C. After being dried at 50° C. for 12 hours under vacuum and sufficiently ground, the obtained powder was heated with a temperature elevation speed of 2° C. min$^{-1}$ in the air until reaching 450° C. and calcined at this temperature for 3 hours. The calcined powder was shaped into tablets, which were then crushed to obtain 30-60 mesh particles as the precursor of catalyst. 0.8 g of the precursor was weighed out and reduced in a hydrogen atmosphere at 400° C. for 5 hours to get 8 wt % of Co-0.1 wt % Na/Beta-0.1M catalyst.

The Fischer-Tropsch synthesis was performed in a stainless steel fixed-bed micro-autoclave, in which the conditions and the product analysis were the same as those described in Example 1, except that the ratio in volume between hydrogen and carbon monoxide in the syngas was 1. The performances were listed in Table 8.

TABLE 8

Catalyst Performances of 8 wt % of Co-0.1 wt % Na/Beta-0.1M

| | |
|---|---|
| CO Conversion (%) | 44.2 |
| CH$_4$ Selectivity (%) | 10.0 |
| Gaseous C$_2$-C$_4$ Hydrocarbon Selectivity (%) | 15.6 |
| Gasoline Fraction (C$_5$-C$_{11}$) Selectivity (%) | 69.0 |
| Diesel Fraction (C$_{12}$-C$_{20}$) Selectivity (%) | 5.1 |
| Wax C$_{21}$$^+$ Selectivity (%) | 0.3 |

Example 9

4.25 g of NaNO$_3$ was added into 100 ml of water to prepare 0.5 mol L$^{-1}$ of NaNO$_3$ solution. 5.0 g of ZSM-5 molecular sieve with the Si/Al ratio of 38 (Produced by Nankai University Catalyst Company, NKF-5) was added into the above prepared solution and the solution was stirred at 70° C. for 60 minutes, then subjected to filtration. The filtered cake was rinsed with de-ionized water until the concentration of Na$^+$ in the filtrate was not more than 90 ppm, then dried at 100° C. for 5 hours. 3.0 g of the pretreated molecular sieve was added into 2.0 mol L$^{-1}$ of NH$_4$NO$_3$ solution, and the solution was stirred at 70° C. for 3 hours, then subjected to filtration. The filtered cake was rinsed with de-ionized water, dried at 100° C. for 10 hours and then calcined at 500° C. for 8 hours in the air to collect the molecular sieve support, which was marked as ZSM-5-0.5M.

A cobalt nitrate solution was prepared by dissolving 0.8856 g of Co(NO$_3$)$_2$.6H$_2$O in 30 ml de-ionized water and then 0.005 g of Mn(CH$_3$COO)$_2$.4H$_2$O was added therein. After stirring until complete dissolution, 2.0 g of ZSM-5-0.5M molecular sieve was added into the above solution, and the solution was stirred for 10 hours at room temperature followed by standing still for 12 hours, then evaporated by a hot water bath at 70° C. After being dried at 50° C. for 12 hours under vacuum and sufficiently ground, the obtained powder was heated with a temperature elevation speed of 2° C. min$^d$ in the air until reaching 450° C. and calcined at this temperature for 3 hours. The calcined powder was shaped into tablets, which were then crushed to obtain 30-60 mesh particles as the precursor of catalyst. 0.8 g of the precursor was weighed out and reduced in a hydrogen atmosphere at 450° C. for 4 hours to get 8 wt % of Co-0.05 wt % Mn/ZSM-5-0.5M catalyst.

The Fischer-Tropsch synthesis was performed in a stainless steel fixed-bed micro-autoclave, in which the conditions and the product analysis were the same as those described in Example 8. The performances were listed in Table 9.

TABLE 9

Catalyst Performances of 8 wt % Co-0.05 wt % Mn/ZSM-5-0.5M

| | |
|---|---|
| CO Conversion (%) | 45.0 |
| CH$_4$ Selectivity (%) | 8.2 |
| Gaseous C$_2$-C$_4$ Hydrocarbon Selectivity (%) | 16.0 |
| Gasoline Fraction (C$_5$-C$_{11}$) Selectivity (%) | 73.0 |
| Diesel Fraction (C$_{12}$-C$_{20}$) Selectivity (%) | 2.6 |
| Wax C$_{21}$$^+$ Selectivity (%) | 0.2 |

Example 10

3.03 g of KNO$_3$ was added into 100 ml of water to prepare 0.3 mol L$^{-1}$ of KNO$_3$ solution. 5.0 g of ZSM-5 molecular sieve with the Si/Al ratio of 38 (Produced by Nankai University Catalyst Company, NKF-5) was added into the above prepared solution, and the solution was stirred at 65° C. for 50 minutes, then subjected to filtration. The filtered cake was rinsed with de-ionized water until the concentration of K$^+$ in the filtrate was not more than 90 ppm, then dried at 120° C. for 5 hours. 3.0 g of the pretreated molecular sieve was added into 1.0 mol L$^{-1}$ of NH$_4$NO$_3$ solution, and the solution was stirred at 70° C. for 2 hours, then subjected to filtration. The filtered cake was rinsed with de-ionized water, dried at 100° C. for 10 hours and then calcined at 550° C. for 6 hours in the air to collect the molecular sieve support, which was marked as ZSM-5-0.3M.

A cobalt nitrate solution was prepared by dissolving 0.8856 g of Co(NO$_3$)$_2$.6H$_2$O in 30 ml de-ionized water and then 0.005 g of Mg(NO$_3$)$_2$.2H$_2$O was added therein. After stirring until complete dissolution, 2.0 g of ZSM-5-0.3M molecular sieve was added into the above solution, and the solution was stirred for 10 hours at room temperature followed by standing still for 12 hours, then evaporated by a hot water bath at 70° C. After being dried at 50° C. for 12 hours under vacuum and sufficiently ground, the obtained powder was heated with a temperature elevation speed of 1° C. min$^{-1}$ in the air until reaching 400° C. and calcined at this temperature for 5 hours. The calcined powder was shaped into tablets, which were then crushed to obtain 30-60 mesh particles as the precursor of catalyst. 0.8 g of the precursor was weighed out and reduced in a hydrogen atmosphere at 400° C. for 7 hours to get 8 wt % of Co-0.05 wt % Mg/ZSM-5-0.3M catalyst.

The Fischer-Tropsch synthesis was performed in a stainless steel fixed-bed micro-autoclave, in which the conditions and the product analysis were the same as those described in Example 8. The performances were listed in Table 10.

TABLE 10

Catalyst Performances of 8 wt % Co-0.05 wt % Mg/ZSM-5-0.3M

| | |
|---|---|
| CO Conversion (%) | 38.9 |
| CH$_4$ Selectivity (%) | 11.0 |
| Gaseous C$_2$-C$_4$ Hydrocarbon Selectivity (%) | 14.9 |
| Gasoline Fraction (C$_5$-C$_{11}$) Selectivity (%) | 68.0 |
| Diesel Fraction (C$_{12}$-C$_{20}$) Selectivity (%) | 6.1 |
| Wax C$_{21}$$^+$ Selectivity (%) | Not detected |

Example 11

0.44 g of NaAlO$_2$ was added into 100 nil of tetra-propyl ammonium bromide solution (10 wt %) and the solution was stirred for 2 hours. 33.12 g of tetra-ethyl orthosilicate was added into the solution based on the mole ratio of Si/Al to be 30:1. Then 30 ml of N,N-dimethyl-N-(3-(trimethylsilyl)propyl)hexadecan-1-ammonium chloride methanol solution (64%) was further added into the prepared solution and the solution was stirred for 2 hours. The prepared suspension was transferred into a hydrothermal autoclave, then kept reacting at 170° C. for 48 hours. Amer the reaction, the reactor was cooled down and the reaction mixture was taken out for filtration and rinsing de-ionized water. The filtered cake was dried at 100° C. for 12 hours, and then the obtained powder was ground sufficiently, and calcined at 550° C. in the air for 8 hours to get ZSM-5(30)-HT molecular sieve.

A cobalt nitrate solution was prepared by dissolving 0.8856 g of $Co(NO_3)_2.6H_2O$ in 25 ml de-ionized water and then 0.008 g of $RuCl_3.3H_2O$ was added therein. After stirring until complete dissolution, 2.0 g of ZSM-5(30)-HT molecular sieve was added into the above solution, and the solution was stirred for 8 hours at room temperature followed by standing still for 15 hours, then evaporated by a hot water bath at 70° C. After being dried at 60° C. for 15 hours under vacuum and sufficiently ground, the obtained powder was heated with a temperature elevation speed of 2° C. $min^{-1}$ in the air until reaching 450° C. and calcined at this temperature for 5 hours. The calcined powder was shaped into tablets, which were then crushed to obtain 30-60 mesh particles as the precursor of catalyst. 0.8 g of the precursor was weighed out and reduced in a hydrogen atmosphere at 450° C. for 5 hours to get 8 wt % of Co-0.05 wt % Ru/ZSM-5(30)-HT catalyst.

The Fischer-Tropsch synthesis was performed in a stainless steel fixed-bed micro-autoclave, in which the conditions and the product analysis were the same as those described in Example 8. The performances were listed in Table 11.

TABLE 11

| Catalyst Performances of 8 wt % Co-0.05 wt % Ru/ZSM-5(30)-HT | |
| --- | --- |
| CO Conversion (%) | 45.5 |
| $CH_4$ Selectivity (%) | 8.1 |
| Gaseous $C_2$-$C_4$ Hydrocarbon Selectivity (%) | 15.6 |
| Gasoline Fraction ($C_5$-$C_{11}$) Selectivity (%) | 73.3 |
| Diesel Fraction ($C_{12}$-$C_{20}$) Selectivity (%) | 3.0 |
| Wax $C_{21}^+$ Selectivity (%) | Not detected |

Example 12

0.82 g of $NaAlO_2$ was added into 30.0 g of tetra-ethyl ammonium hydroxide solution (20 wt %), and the solution was stirred for 2 hours. 15.0 g of fumed silica was added into the solution based on the mole ratio of Si/Al to be 25:1, and the solution was stirred for 1 hour. The prepared suspension was transferred into a hydrothermal autoclave and kept reacting at 140° C. for 48 hours. After the reaction, the reactor was cooled down and the reaction mixture was taken out and added into 30.0 g of hexadecyl trimethyl ammonium bromide (10 wt %) aqueous solution, then pH thereof was adjusted to 9.0 with 50 wt % of acetic acid. The solution was charged back into the hydrothermal autoclave and treaded at 140° C. for 48 hours. After the reaction, the reactor was cooled down and the reaction mixture was taken out for filtration and rinsing with de-ionized water. The filtered cake was dried at 100° C. for 12 hours. The obtained powder was ground sufficiently and calcined at 550° C. in the air for 8 hours to get Beta(25)-HT molecular sieve.

A cobalt nitrate solution was prepared by dissolving 0.8856 g of $Co(NO_3)_2.6H_2O$ in 25 ml de-ionized water and then 0.005 g of $Mn(CH_3COO)_2.4H_2O$ was added therein. After stirring until complete dissolution, 2.0 g of Beta(25)-HT molecular sieve was added into the above solution, and stirred for 8 hours at room temperature followed by standing still for 15 hours, then evaporated by a hot water bath at 70° C. After being dried at 50° C. for 12 hours under vacuum and sufficiently ground, the obtained powder was heated with a temperature elevation speed of 2° C. $min^{-1}$ in the air until reaching 450° C. and calcined at this temperature for 3 hours. The calcined powder was shaped into tablets, which were then crushed to obtain 30-60 mesh particles as the precursor of catalyst. 0.8 g of the precursor was weighed out and reduced in a hydrogen atmosphere at 430° C. for 5 hours to get 8 wt % of Co-0.05 wt % Mn/Beta(25)-HT catalyst.

The Fischer-Tropsch synthesis was performed in a stainless steel fixed-bed micro-autoclave, in which the conditions and the product analysis were the same as those described in Example 1. The performances were listed in Table 12.

TABLE 12

| Catalyst Performances of 8 wt % Co-0.05 wt % Mn/Beta(25)-HT | |
| --- | --- |
| CO Conversion (%) | 84.5 |
| $CH_4$ Selectivity (%) | 13.0 |
| Gaseous $C_2$-$C_4$ Hydrocarbon Selectivity (%) | 14.7 |
| Gasoline Fraction ($C_5$-$C_{11}$) Selectivity (%) | 69.2 |
| Diesel Fraction ($C_{12}$-$C_{20}$) Selectivity (%) | 3.1 |
| Wax $C_{21}^+$ Selectivity (%) | Not detected |

Example 13

1.64 g of $NaAlO_2$ was added into 60.0 g of tetra-ethyl ammonium hydroxide solution (15 wt %), then the resulted solution was stirred for 2 hours. 60.0 g of fumed silica was added into the solution based on the mole ratio of Si/Al to be 50, stirring for 2 hours. The prepared solution was transferred into a hydrothermal autoclave and kept reacting at 130° C. for 72 hours. After the reaction, the reactor was cooled down and the reaction mixture was taken out and added into 50.0 g of hexadecyl trimethyl ammonium bromide (10 wt %) aqueous solution, then pH thereof was adjusted to 8.5 with 60 wt % of acetic acid. The solution was charged back into the hydrothermal autoclave and treaded at 130° C. for 72 hours. After the reaction, the reactor was cooled down and the reaction mixture was taken out for filtration and rinsing with de-ionized water. The filtered cake was dried at 100° C. for 12 hours. The obtained powder was ground sufficiently and calcined at 530° C. in the air for 10 hours to get Beta(50)-HT molecular sieve.

A cobalt nitrate solution was prepared by dissolving 1.3284 g of $Co(NO_3)_2.6H_2O$ in 40 ml de-ionized water and then 0.006 g of $Zr(NO_3)_{4.5}H_2O$ was added therein. After stirring until complete dissolution, 2.0 g of Beta(50)-HT molecular sieve was added into the above solution, the solution was stirred for 10 hours at room temperature followed by standing still for 12 hours, then evaporated by a hot water bath at 60° C. After being dried at 50° C. for 15 hours under vacuum and sufficiently ground, the obtained powder was heated with a temperature elevation speed of 2° C. $min^{-1}$ in the air until reaching 450° C. and calcined at this temperature for 5 hours. The calcined powder was shaped into tablets, which were then crushed to obtain 30-60 mesh particles as the precursor of catalyst. 0.8 g of the precursor was weighed out and reduced in a hydrogen atmosphere at 400° C. for 8 hours to get 12 wt % of Co-0.1 wt % Zr/Beta(50)-HT catalyst.

The Fischer-Tropsch synthesis was performed in a stainless steel fixed-bed micro-autoclave, in which the conditions and the product analysis were the same as those described in Example 1. The performances were listed in Table 13.

TABLE 13

Catalyst Performances of 12 wt % Co-0.1 wt % Zr/Beta(50)-HT

| | |
|---|---|
| CO Conversion (%) | 86.0 |
| $CH_4$ Selectivity (%) | 15.1 |
| Gaseous $C_2$-$C_4$ Hydrocarbon Selectivity (%) | 14.4 |
| Gasoline Fraction ($C_5$-$C_{11}$) Selectivity (%) | 66.3 |
| Diesel Fraction ($C_{12}$-$C_{20}$) Selectivity (%) | 4.2 |
| Wax $C_{21}^+$ Selectivity (%) | Not detected |

Comparative Example 1

A cobalt nitrate solution was prepared by dissolving 1.6605 g of $Co(NO_3)_2 \cdot 6H_2O$ in 30 ml of de-ionized water and then 0.0674 g of $NaNO_3$ was added therein. After stirring until completely dissolved, 2.0 g of ZSM-5 molecular sieve with the Si/Al ratio of 38 (Produced by Nankai University Catalyst Company, NKF-5) was added into the solution, and the solution was stirred for 4 hours at room temperature followed by standing still for 10 hours, then evaporated by hot water bath at 60° C. After being dried at 50° C. for 10 hours under vacuum and sufficiently ground, the obtained powder was heated with a temperature elevation speed of 5° C. $\min^{-1}$ in the air until reaching 450° C. and calcined at this temperature for 8 hours. The calcined powder was shaped into tablets, which were then crushed to obtain 30-60 mesh particles as the precursor of catalyst. 0.8 g of the precursor of catalyst was weighed out and reduced in a hydrogen atmosphere at 450° C. for 3 hours to get 15 wt % Co-1 wt % Na/ZSM-5 catalyst.

The Fischer-Tropsch synthesis was performed in a stainless steel fixed-bed micro-autoclave, in which the conditions of the reaction and the product analysis were the same as those described in Example 1. The performances were listed in Table 14.

TABLE 14

Catalyst Performances of 15 wt % Co-1 wt % Na/ZSM-5

| | |
|---|---|
| CO Conversion (%) | 81.3 |
| $CH_4$ Selectivity (%) | 22.1 |
| Gaseous $C_2$-$C_4$ Hydrocarbon Selectivity (%) | 18.5 |
| Gasoline Fraction ($C_5$-$C_{11}$) Selectivity (%) | 55.8 |
| Diesel Fraction ($C_{12}$-$C_{20}$) Selectivity (%) | 3.6 |
| Wax $C_{21}^+$ Selectivity (%) | Not detected |

Comparative Example 2

A cobalt nitrate solution was prepared by dissolving 0.8856 g of $Co(NO_3)_2 \cdot 6H_2O$ in 20 ml de-ionized water and then 0.005 g of $Mn(CH_3COO)_2 \cdot 4H_2O$ was added therein. After stirring until complete dissolution, 2.0 g of Beta molecular sieve with the Si/Al ratio of 25 (Produced by Nankai University Catalyst Company, NKF-6) was added into the above solution, and the solution was stirred for 4 hours at room temperature followed by standing still for 10 hours, then evaporated by a hot water bath at 60° C. After being dried at 50° C. for 10 hours under vacuum and sufficiently ground, the obtained powder was heated with a temperature elevation speed of 5° C. $\min^{-1}$ in the air until reaching 450° C. and calcined at this temperature for 8 hours. The calcined powder was shaped into tablets, which were then crushed to obtain 30-60 mesh particles as the precursor of catalyst. 1.0 g of the precursor was weighed out and reduced in a hydrogen atmosphere at 450° C. for 3 hours to get 8 wt % of Co-0.05 wt % MD/Beta catalyst.

The Fischer-Tropsch synthesis was performed in a stainless steel fixed-bed micro-autoclave, in which the conditions and the product analysis were the same as those described in Example 1. The performances were listed in Table 15.

TABLE 15

Catalyst Performances of 8 wt % Co-0.05 wt % Mn/Beta

| | |
|---|---|
| CO Conversion (%) | 75.3 |
| $CH_4$ Selectivity (%) | 17.4 |
| Gaseous $C_2$-$C_4$ Hydrocarbon Selectivity (%) | 18.8 |
| Gasoline Fraction ($C_5$-$C_{11}$) Selectivity (%) | 57.5 |
| Diesel Fraction ($C_{12}$-$C_{20}$) Selectivity (%) | 5.1 |
| Wax $C_{21}^+$ Selectivity (%) | 1.2 |

Comparative Example 3

A cobalt nitrate solution was prepared by dissolving 0.8856 g of $Co(NO_3)_2 \cdot 6H_2O$ in 30 ml de-ionized water and then 0.005 g of $Mg(NO_3)_2 \cdot 2H_2O$ was added therein. After stirring until complete dissolution, 2.0 g of ZSM-5 molecular sieve with the Si/Al ratio of 38 (Produced by Nankai University Catalyst Company, NKF-5) was added into the above solution, and the solution was stirred for 10 hours at room temperature followed by standing still for 12 hours, then evaporated by a hot water bath at 70° C. After being dried at 50° C. for 12 hours under vacuum and sufficiently ground, the obtained powder was heated with a temperature elevation speed of 1° C. $\min^{-1}$ in the air until reaching 400° C. and calcined at this temperature for 5 hours. The calcined powder was shaped into tablets, which were then crushed to obtain 30-60 mesh particles as the precursor of catalyst. 0.8 g of the precursor was weighed out and reduced in a hydrogen atmosphere at 400° C. for 7 hours to get 8 wt % of Co-0.05 wt % Mg/ZSM-5 catalyst.

The Fischer-Tropsch synthesis was performed in a stainless steel fixed-bed micro-autoclave, in which the conditions and the product analysis were the same as those described in Example 8. The performances were listed in Table 16.

TABLE 16

Catalyst Performances of 8 wt % Co-0.05 wt % Mg/ZSM-5

| | |
|---|---|
| CO Conversion (%) | 25.0 |
| $CH_4$ Selectivity (%) | 15.1 |
| Gaseous $C_2$-$C_4$ Hydrocarbon Selectivity (%) | 20.5 |
| Gasoline Fraction ($C_5$-$C_{11}$) Selectivity (%) | 56.7 |
| Diesel Fraction ($C_{12}$-$C_{20}$) Selectivity (%) | 6.3 |
| Wax $C_{21}^+$ Selectivity (%) | 1.4 |

TABLE 17

Comparison of the performances for the catalysts prepared in the Examples and the Comparative Examples

| Examples/ Comparative Examples | Conv. | $S_1$ | $S_{2-4}$ | $S_{5-11}$ | $S_{12-20}$ | $S_{21+}$ |
|---|---|---|---|---|---|---|
| 1 | 90.5 | 12.0 | 12.1 | 71.7 | 4.2 | Not detected |
| 2 | 86.0 | 12.5 | 11.1 | 67.4 | 8.8 | 0.2 |
| 3 | 91.4 | 15.0 | 13.2 | 69.1 | 2.7 | Not detected |
| 4 | 36.1 | 16.5 | 13.2 | 60.6 | 9.1 | 0.6 |
| 5 | 95.3 | 11.5 | 13.8 | 61.7 | 10.5 | 2.5 |
| 6 | 85.3 | 14.3 | 14.0 | 66.8 | 4.9 | Not detected |
| 7 | 93.0 | 12.3 | 12.5 | 70.1 | 5.1 | Not detected |
| 8 | 44.2 | 10.0 | 15.6 | 69.0 | 5.1 | 0.3 |
| 9 | 45.0 | 8.2 | 16.0 | 73.0 | 2.6 | 0.2 |

TABLE 17-continued

Comparison of the performances for the catalysts prepared in the Examples and the Comparative Examples

| Examples/ Comparative Examples | Conv. | $S_1$ | $S_{2-4}$ | $S_{5-11}$ | $S_{12-20}$ | $S_{21+}$ |
|---|---|---|---|---|---|---|
| 10 | 38.9 | 11.0 | 14.9 | 68.0 | 6.1 | Not detected |
| 11 | 45.5 | 8.1 | 15.6 | 73.3 | 3.0 | Not detected |
| 12 | 84.5 | 13.0 | 14.7 | 69.2 | 3.1 | Not detected |
| 13 | 86.0 | 15.1 | 14.4 | 66.3 | 4.2 | Not detected |
| 14 | 81.3 | 22.1 | 18.5 | 55.8 | 3.6 | Not detected |
| 15 | 75.3 | 17.4 | 18.8 | 57.5 | 5.1 | 1.2 |
| 16 | 25.0 | 15.1 | 20.5 | 56.7 | 6.3 | 1.4 |

Notes:
Conv. represents conversion of CO,
$S_1$ represents $CH_4$ selectivity (%),
$S_{2-4}$ represents Gaseous $C_2$-$C_4$ Hydrocarbons Selectivity (%),
$S_{5-11}$ represents Gasoline Fractions ($C_5$-$C_{11}$) Selectivity (%),
$S_{12-20}$ represents Diesel Fractions ($C_{12}$-$C_{20}$) Selectivity (%) and
$S_{21+}$ represents Wax $C_{21+}$ Selectivity (%).
In the table above, the items of 14, 15 and 16 respectively indicate the data of the Comparative Examples 1-3.

The invention claimed is:

1. A high-selectivity catalyst for production of high-quality gasoline fractions from syngas, consisting of cobalt, a promoter and a molecular sieve, wherein the cobalt is presented in an amount of 1-30%, the promoter is presented in an amount of 0.01-5% and the balance is the molecular sieve based on the weight of the catalyst,
wherein the molecular sieve is selected from the group consisting of Beta, ZSM-5, MOR, Y, and MCM-22 and is treated by a basic solution, wherein the molecular sieve is treated by the following steps in sequence:
(1) preparing the basic solution with a concentration from 0.005 mol $L^{-1}$ to saturation which is formed by solving one or more of nitrate, nitrite, carbonate, bicarbonate, chloride, oxalate, acetate, citrate, hydroxide and oxide of an alkali or alkaline-earth metal in water;
(2) mixing the molecular sieve and the basic solution with a ratio of the bulk volume of the molecular sieve to the volume of the basic solution to be 0.2 to 20 and stirring for 0.1-5 hours at a temperature ranging from room temperature to 150° C., to obtain a mixture;
(3) filtering the obtained mixture and rinsing with de-ionized water until the concentration of the alkali or alkaline earth metal ion is not higher than 1 wt % in the filtrate, sufficiently drying the filtered cake until physically adsorbed water content is within 5% by weight of the filtered cake, and then obtaining a new molecular sieve; and
(4) adding the obtained molecular sieve into 0.05-3.0 mol $L^{-1}$ of an ammonium solution, wherein the ammonium is one or more of $NH_4NO_3$, $NH_4Cl$, $(NH_4)_2CO_3$, $NH_4HCO_3$ and $CH_3COONH_4$, stirring the mixture for 0.1-3 hours at 30-100° C., filtering and rinsing the mixture with de-ionized water until the concentration of ammonium and anions is not higher than 100 ppm in the filtrate, then drying the filtered cake at 80-120° C. for 5-20 hours and calcining at 400-600° C. for 3-10 hours in the air to get the molecular sieve after treatment, and wherein the promoter is one or more selected from Na, K, Mg, Mn, Ru, Zr, Ce, and La.

2. The catalyst according to claim 1, wherein cobalt is represented in an amount of 8-15% and the promoter is represented in an amount of 0.05-2% based on the weight of the catalyst.

3. The catalyst according to claim 2, wherein the molecular sieve has a Si/Al ratio that is 5-300.

4. The catalyst according to claim 3, wherein the molecular sieve has acidity that is denoted by an amount of $NH_3$ adsorbed, and the adsorbing capability of the molecular sieve is 0.16-0.50 mmol $NH_3$/g wherein the molecular sieve has a micropore-mesopore structure, wherein the micropore has a diameter of 0.4-0.9 nm, and the mesopore has a diameter of 2-30 nm, the specific surface area of the molecular sieve is 100-900 $m^2 g^{-1}$, the pore volumes of the micropores is 0.1-0.6 $cm^3 g^{-1}$ and the pore volume of the mesopores is 0.1-0.6 $cm^3 g^{-1}$.

5. The catalyst according to claim 1, wherein the promoter is one or more selected from Mn, Na, and Ru.

6. A preparation method of a high-selectivity catalyst used for synthesis of high-quality gasoline fractions from syngas via Fischer-Tropsch synthesis, and is consisting of cobalt, a promoter and a molecular sieve, wherein the cobalt is presented in an amount of 1-30%, the promoter is presented in an amount of 0.01-5% and the balance is the molecular sieve based on the weight of the catalyst,
wherein the method comprises steps of:
(1) weighing a cobalt salt according to the content of the cobalt in the catalyst, admixing with a solvent of de-ionized water, an alcohol or a ketone to prepare a 0.5-20 wt % of cobalt salt solution;
(2) weighing the promoter according to the content thereof in the catalyst, adding into the prepared cobalt salt solution and stirring for 0.5-3 hours;
(3) weighing the molecular sieve according to the content thereof in the catalyst, adding the molecular sieve into the prepared cobalt salt solution, stirring for 0.1-15 hours and standing still for 0.1-24 hours;
(4) evaporating the solid-liquid mixture at 40-100° C. and drying the solid at 30-100° C. in vacuum for 1-24 hours;
(5) calcining the dried solid powder at 300-550° C. for 2-10 hours in the air;
(6) shaping the calcined powder as a precursor of the catalyst; and
(7) subjecting the precursor of the catalyst to reduction at 300-550° C. for 1-10 hours in an atmosphere of hydrogen or hydrogen-inert gas,
wherein the molecular sieve is one or more selected from the group consisting of Beta, ZSM-5, MOR, Y and MCM-22, and the molecular sieve is treated by a basic solution by the following steps in sequence:
(1) preparing a basic solution with a concentration from 0.005 mol $L^{-1}$ to saturation, which is formed by dissolving one or more of nitrate, nitrite, carbonate, bicarbonate, chloride, oxalate, acetate, citrate, hydroxide and oxide of an alkali or an alkaline-earth metal in water;
(2) mixing the molecular sieve and the basic solution according to a ratio of the bulk volume of the molecular sieve to the volume of the basic solution to be 0.2-20, and stirring for 0.1-5 hours at a temperature ranging from room temperature to 150° C. to obtain a mixture;
(3) filtering the obtained mixture and rinsing with de-ionized water until the concentration of the alkali or alkaline earth metal ion is not higher than 1 wt % in the filtrate, sufficiently drying the filtered cake until physically adsorbed water content is within 5% by weight of the filtered cake and then obtaining a molecular sieve; and
(4) adding the obtained molecular sieve into 0.05-3.0 mol $L^{-1}$ of an ammonium solution, wherein the ammonium is one or more of $NH_4NO_3$, $NH_4Cl$, $(NH_4)_2CO_3$, $NH_4HCO_3$ and $CH_3COONH_4$, stirring the mixture for 0.1-3 hours at 30-100° C., filtering and rinsing the mixture with de-ionized water until the concentration of ammonium and anions is not higher than 100 ppm in the filtrate, then drying the filtered cake at 80-120° C. for 5-20 hours and calcining at 400-600° C. for 3-10 hours in the air to get the molecular sieve after treatment, and wherein the promoter is one or more selected from the group consisting of Na, K, Mg, Mn, Ru, Zr, Ce, and La.

7. The preparation method of the catalyst according to claim 6, wherein in the catalyst, cobalt is represented in an amount of 8-15% and the promoter is represented in an amount of 0.05-2% based on the weight of the catalyst.

8. The preparation method of the catalyst according to claim 6, wherein the cobalt salt is any one or more selected from $CoCl_2$, $Co(NO_3)_2$, $CoBr_2$, Cobalt(II) acetylacetonate and $Co(OOCCH_3)_2$.

9. The preparation method of the catalyst according to claim 8, wherein the cobalt salt solution is prepared with de-ionized water and the concentration thereof is 0.5-20 wt %.

10. The preparation method of the catalyst according to claim 9, wherein the promoter comprises an element that is one or more selected from metal elements of Mn Na Ru; the promoter is in a form of salt that is one or more of chloride, nitrate, bromide and acetate of the promoter element.

* * * * *